United States Patent
Gaunt et al.

(10) Patent No.: US 7,216,251 B2
(45) Date of Patent: May 8, 2007

(54) COMPUTER IMAGING RECOVERY WITHOUT A WORKING PARTITION OR A SECONDARY MEDIUM

(75) Inventors: Jared R. Gaunt, Orem, UT (US); Val A. Arbon, Orem, UT (US)

(73) Assignee: Powerquest Corporation, Orem, UT (US)

( * ) Notice: Subject to any disclaimer, the term of this patent is extended or adjusted under 35 U.S.C. 154(b) by 636 days.

(21) Appl. No.: 10/449,728

(22) Filed: Jun. 1, 2003

(65) Prior Publication Data
US 2003/0221095 A1 Nov. 27, 2003

Related U.S. Application Data

(63) Continuation-in-part of application No. 09/788,191, filed on Feb. 17, 2001, now Pat. No. 6,996,706, which is a continuation-in-part of application No. 09/532,223, filed on Mar. 22, 2000, now Pat. No. 6,615,365.

(60) Provisional application No. 60/188,671, filed on Mar. 11, 2000, provisional application No. 60/183,725, filed on Feb. 19, 2000.

(51) Int. Cl.
G06F 11/00 (2006.01)
(52) U.S. Cl. .................... 714/6; 714/5; 714/7
(58) Field of Classification Search .............. 714/3, 714/5, 6, 7; 707/204; 711/161; 713/1, 2
See application file for complete search history.

(56) References Cited

U.S. PATENT DOCUMENTS

| | | | |
|---|---|---|---|
| 5,852,713 A * | 12/1998 | Shannon ................. | 714/6 |
| 5,966,732 A | 10/1999 | Assaf ..................... | 711/170 |
| 6,088,778 A * | 7/2000 | Ruff et al. .............. | 711/173 |
| 6,115,705 A * | 9/2000 | Larson ................... | 707/3 |
| 6,178,487 B1 * | 1/2001 | Ruff et al. .............. | 711/165 |
| 6,178,503 B1 * | 1/2001 | Madden et al. .......... | 713/2 |
| 6,185,575 B1 * | 2/2001 | Orcutt ..................... | 707/200 |
| 6,490,722 B1 | 12/2002 | Barton et al. ........... | 717/174 |
| 6,615,365 B1 * | 9/2003 | Jenevein et al. ......... | 714/6 |
| 6,718,446 B1 * | 4/2004 | Peters et al. ............ | 711/162 |

(Continued)

OTHER PUBLICATIONS

StorageSoft, "Area51 Onboard System Recovery", 2000, all pages.*

(Continued)

Primary Examiner—Scott Baderman
Assistant Examiner—Timothy M Bonura
(74) Attorney, Agent, or Firm—Workman Nydegger

(57) ABSTRACT

An initial setup method (100) stores recovery tools (400) and a further setup script (402) on a computer (1000) which has an operating system (302) that need not have any recovery capabilities. At the user site, a further setup method (700, 800) reserves (706) a container space (500) in the file system space (304), creates (716) an image (1008) of the main partition (300), and stores (720) the image in the container. If the partition is corrupted later, the computer can still be booted using virtual boot tools (602), the image can be retrieved (914) from the container even though the partition around it was lost, and the image can then be deployed onto disk (200) over the corrupted partition, thereby restoring a working partition to the computer. This can be done without secondary media such as a recovery CD or floppy, and without a network connection.

22 Claims, 8 Drawing Sheets

U.S. PATENT DOCUMENTS

| | | | |
|---|---|---|---|
| 6,920,555 B1* | 7/2005 | Peters et al. | 713/100 |
| 6,931,522 B1* | 8/2005 | Raghavan et al. | 713/2 |
| 6,996,706 B1* | 2/2006 | Madden et al. | 713/2 |
| 7,024,581 B1* | 4/2006 | Wang et al. | 714/2 |
| 2002/0162100 A1* | 10/2002 | Liles et al. | 717/174 |
| 2003/0191911 A1* | 10/2003 | Kleinschnitz et al. | 711/154 |
| 2003/0221095 A1* | 11/2003 | Gaunt et al. | 713/1 |
| 2004/0088692 A1* | 5/2004 | Stutton et al. | 717/168 |
| 2005/0044548 A1* | 2/2005 | Page | 718/100 |

OTHER PUBLICATIONS

PCT Published Patent Application PCT/US02/05862, Peters et al., filed Feb. 21, 2002.

PowerQuest® V2i Protector White Paper; copyright date 2002.

PowerQuest PQIDeploy 5.1.1 User Guide; copyright dates 2001-2002.

PowerQuest Config Center Deploy Suite White Paper; copyright dates 2001-2002.

PowerQuest Storage Manager Newsletter; Aug./Sep. 2001.

Soft Solutions presentation of PowerQuest V2i Protector software press release; Aug. 21, 2002.

PowerQuest PowerDeploy Option brochure; copyright date 2003.

PowerQuest EasyRestore White Paper; copyright date 2000.

Soft Solutions presentation of information about PowerQuest PowerDeploy Suite software; "last modified" date Feb. 6, 2003.

BrightStor™ Mobile Backup brochure; copyright date 2001.

Boot Engineering Extension Record (BEER) proposal: document T13/D98128R0 from Technical Committee T13 of the InterNational Committee on Information Technology Standards (INCITS) (*see* www.t13.org); Sep. 9th, 1998.

"Project 1367, NCITIS 346" from www.ncits.org web site; download date Apr. 27, 2003.

PowerQuest presentation slides; date unknown.

"Area 51: Onboard System Recovery"; copyright date 2000.

Tools for MBR/Boot Records and References; "last update" date Jan. 18, 2003.

Preboot Execution Environment (PXE) Specification, Version 2.1, title, table of contents, pp. 71-90, 99-101; Sep. 20, 1999.

OS Deployment Strategies with Intel® LANDesk® Management Suite and PowerQuest, Version 1.4; Jun. 2001.

\* cited by examiner

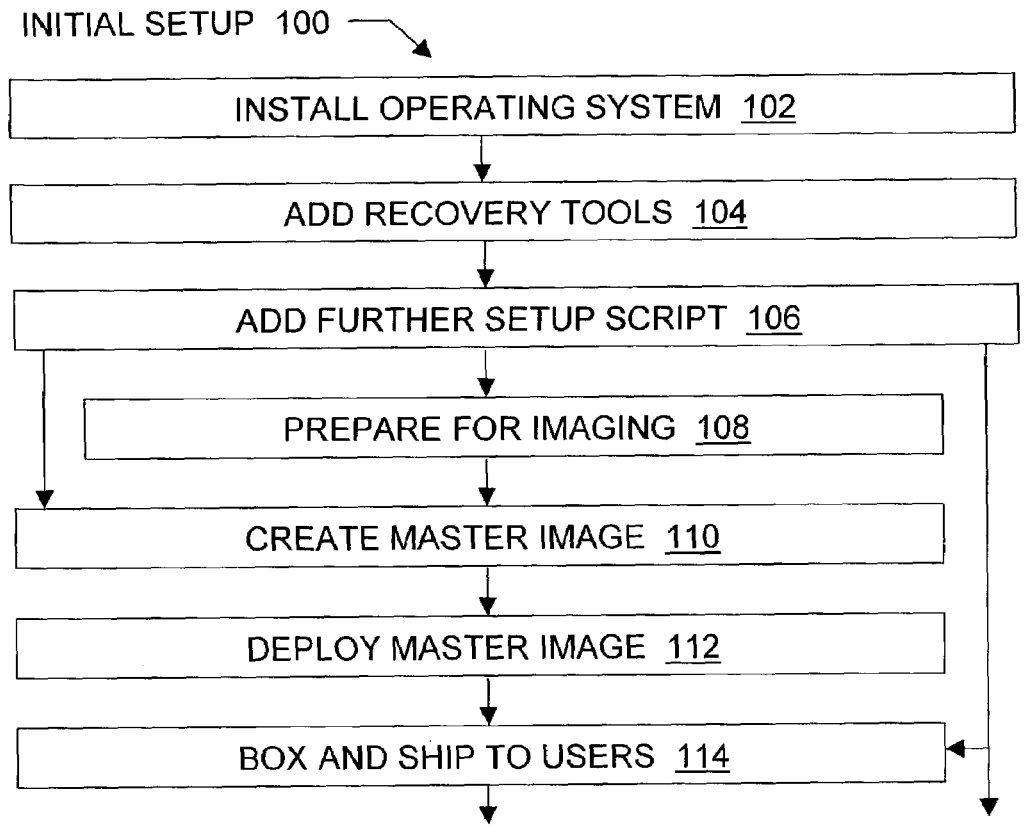
Fig. 1
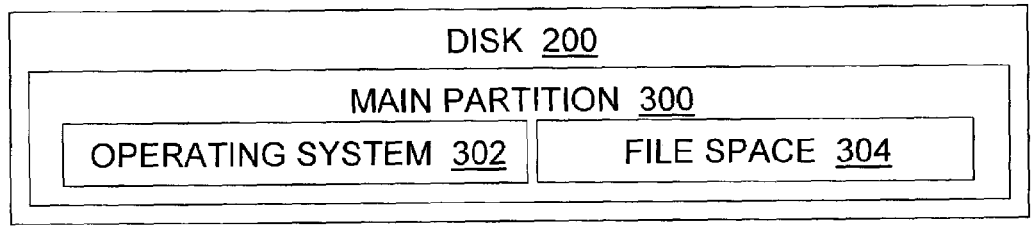
(PRIOR ART)
Fig. 2
| DISK 200 | | |
|---|---|---|
| MAIN PARTITION 300 | | |
| OPERATING SYSTEM 302 | | FILE SPACE 304 |
(PRIOR ART)
Fig. 3

COMPUTER IMAGING RECOVERY WITHOUT A WORKING PARTITION OR A SECONDARY MEDIUM

RELATED APPLICATIONS

This application is a continuation-in-part of U.S. patent application Ser. No. 09/788,191 filed Feb. 17, 2001, now U.S Pat. No. 6,996,706 which is a non-provisional of U.S. provisional patent application Ser. No. 60/183,725 filed Feb. 19, 2000, each of which is incorporated herein by reference. This application is also a continuation-in-part of U.S. patent application Ser. No. 09/532,223 filed Mar. 22, 2000, now U.S. Pat. No. 6,615,365 which is a non-provisional of U.S. provisional patent application Ser. No. 60/188,671 filed Mar. 11, 2000, each of which is incorporated herein by reference.

FIELD OF THE INVENTION

The present invention relates generally to computer imaging and data recovery, and relates more particularly to tools and techniques for creating an archived disk image of a partition on the partition's disk and then reinstalling the image onto the disk to restore the partition after it was corrupted or otherwise lost, without using a recovery CD or other secondary medium to hold a copy of the image. The parent non-provisional applications were placed by the United States Patent and Trademark Office in U.S. classes 713 and 345.

TECHNICAL BACKGROUND OF THE INVENTION

U.S. patent application Ser. No. 09/532,223 filed Mar. 22, 2000, which is assigned to PowerQuest Corporation and incorporated herein by reference, describes tools and techniques for storing and recovering images in a computer partition, and more particularly tools and techniques for placing and extracting disk partition images to and from the same partition that is imaged. However, preferred embodiments of the present invention operate to permit image recovery using an image stored in what was once a partition even when a working partition is no longer present, e.g., when the partition table has been overwritten or corrupted. Thus, although an embodiment of the present invention may comprise technology claimed in application Ser. No. 09/532,223, the present invention goes substantially beyond the teachings of that previous application.

U.S. patent application Ser. No. 09/788,191 filed Feb. 17, 2001, which is assigned to PowerQuest Corporation and incorporated herein by reference, describes tools and techniques for running pre-boot code on a computer from a file stored in a file system on the computer; the pre-boot code may be obtained by redirecting floppy drive I/O. It discusses a "virtual floppy" technology which can be used to provide a virtual boot environment for the present invention. However, preferred embodiments of the present invention restore or install a disk image by pulling it out of a container on disk and then installing the image on the disk that held the image container. The nature of the images involved in the two patent applications also differs somewhat, since the virtual floppy image does not necessarily contain a working partition with an installed standard operating system, whereas the present invention's recovery image typically does. Some preferred embodiments of the present invention also lock the container on disk to prevent it from being inadvertently moved, deleted, or modified, a feature which is not required by the virtual floppy technology. Although the virtual floppy image may be loaded from the hard disk, the virtual floppy technology also contemplates routinely loading the image off a CD or other secondary medium instead of the disk, whereas the present invention preferably requires no secondary medium apart from the computer's hard disk(s). Thus, although for one or more of these reasons an embodiment of the present invention may comprise technology claimed in application Ser. No. 09/788,191, the present invention also goes substantially beyond the teachings of that previous application.

PowerQuest Corporation designs, implements, and commercially provides software for computer storage imaging, such as the PowerQuest DRIVE IMAGE® and V2I products. V2I is a mark, and DRIVE IMAGE is a registered mark, of PowerQuest Corporation. Imaging is also discussed in U.S. Pat. Nos. 6,253,300 and 6,108,697, which are assigned to PowerQuest. Propagation of computer storage images to multiple computers is sometimes referred to as "deployment" but in the present application deployment implies installation of an image onto one or more computers, which differs from merely placing an image file or container on a machine without installing the image there.

Gateway 2000, Inc. is assignee of U.S. Pat. No. 5,966,732, which discusses a method for expanding the reserve area of a disk drive to allow computer system manufacturers to change the storage capacity of the reserve area. The computer system manufacturer can add critical data and critical program instructions to the expanded or new reserve area. The computer manufacturer may decide to store a portion of a virus scan program in the expanded reserve area, or store a portion of the basic input output system (BIOS) so that a smaller BIOS read only memory (ROM) can be used for the computer system, or the computer manufacturer can store emergency boot up instructions in the reserve area in the event there is damage to the disk. A disk image for recovering a disk's partition(s) according to the present invention could be stored in such a reserve area on the disk, but a keyword search of U.S. Pat. No. 5,966,732 disclosed no uses of "image", "imaging", "recovery", or "recovering".

Phoenix Technologies, Inc. has disclosed a Boot Engineering Extension Record (BEER) proposal, which is discussed in document T13/D98128RO available under specified conditions from Technical Committee T13 of the InterNational Committee on Information Technology Standards (INCITS); see www.t13.org. The stated goals of the BEER proposal are to "1. Enable BIOS, Option ROM, and OS software to provide the user with a simple, consistent way of addressing all of the storage devices on a PC. 2. Provide a mechanism for the user to select any bootable device. In the case of a mass storage device, the user should be able to pick any bootable partition. 3. The mechanisms in this proposal are designed to last 20 years or more." Some preferred embodiments of the present invention comprise selecting a virtual boot option. Unlike the BEER proposal, however, preferred recovery solutions of the present invention operate on standard hardware and firmware, such as industry standard ATA IDE or SCSI hard drive systems commonly sold in the retail market, without additional modification beyond the software that is documented here.

During "proof of concept" testing of aspects of the present invention, inventor Jared Gaunt created a main partition and a secondary partition on a disk, placed a disk image into the secondary partition, and then merged the secondary partition into the main partition. This provided a single partition having a file containing an image which could then be brought into memory piece-by-piece and laid over the disk, overwriting the main partition. A preliminary name for the present invention was "single disk single partition recovery". U.S. Pat. No. 6,185,666, which is assigned to Power-Quest Corporation, describes tools and techniques for merging computer disk partitions. However, an advantage of some preferred embodiments of the present invention is that no working partition is required.

BRIEF SUMMARY OF THE INVENTION

One aspect of the present invention provides tools and techniques which can be used for "recovering" an operating system into a partition or otherwise deploying an image onto a computer. Depending on the embodiment and the situation at hand, such recovery comprises restoring an operating system that was previously installed in the partition, overwriting one installed operating system with another, and/or initially installing an operating system into a partition that lacks one.

Another view of the present invention is that it provides additional approaches which build on the previously specified processes of U.S. patent application Ser. No. 09/532,223 for storing information in a container that resides within a computer's primary partition file space. In contrast with that application, however, a container used in some embodiments of the present invention has the additional express characteristics that it contains a deployable image of at least one partition, and that it cannot be moved or deleted by normal user actions. One use for the container is to hold a recovery image file which can be used to restore the primary file system without destroying the container. The present invention specifies steps to build the container, to use the container to recover the primary file system, and to make the container a part of the primary file system once again.

An initial setup method of the invention can be used to facilitate recovery from loss or corruption of data stored on a computer disk attached to a computer. The method includes storing on the disk recovery tools which comprise virtual booting code and imaging code. The virtual booting code is capable of booting the computer attached to the disk from an image that was stored on the disk even if the disk has no working partition at the time the virtual booting code runs. The imaging code is capable of creating an image of a main working partition on the disk without using a second partition, storing that image in a container in the main working partition on the disk, and restoring that image back over the main partition's location onto the disk outside the container. The method also includes storing on the disk a further setup script which will cause the computer to perform a further setup method at a later time.

A further setup method reserves space on the disk for a container; records on the disk at least one physical address for identifying the location of the container space; creates an image of the partition excluding the container space, on the computer and without using a network connection; stores the image in the container, which may be in the imaged partition; and stores disk recovery tools in the container if they are not part of the image. Code on the disk may allow a user to restore the image onto the disk even if no working partition is present on the disk.

The invention also provides a method for deploying an image onto a computer hard disk. The method may be performed for a purpose such as recovery from the loss or corruption of data. The method includes running virtual boot code, from the hard disk, which is capable of booting the computer when the hard disk has no working partitions; locating on the hard disk within a corrupted partition a container which holds an image of a hard disk partition; and deploying the located image onto the hard disk outside the container, thereby configuring the hard disk with a working partition which replaces the corrupted partition.

A computer system according to the invention has a processor, RAM operably connected to the processor for executing code, and a disk accessible to the processor. The disk is configured by tools and a further setup script. A main partition of the disk is non-working due to loss of partition table data, MBR corruption, virus damage, FDISK errors, CHKDSK errors, missing but required operating system code, and/or other data problems (as opposed to hardware problems) that prevent normal use of the partition. The tools include virtual booting code and imaging code. The virtual booting code is capable of booting the computer from an image stored on the disk even though the disk has no working main partition. The imaging code is capable of reading an image of a working partition from a container on the disk, and deploying that image onto the disk outside the container. Executing the further setup script will configure the computer to make it capable to read the image from the container and deploy the image onto the disk outside the container when a recovery boot is requested by the user.

Another computer system of the invention has a processor, RAM, and a disk configured by a container holding a recovery image, a sector list data structure, and code. The code may allow a user to deploy the recovery image onto the disk when no working partition is present on the disk. The code may allow a user to deploy the recovery image without making use of any secondary storage medium such as a floppy disk or a CD. The code may allow a user to deploy the recovery image onto the disk without using a second partition on the disk, a secondary medium, or a network connection.

Other embodiments, features, and advantages of the present invention will become more fully apparent through the description below. The present invention is defined by the claims, and to the extent this summary conflicts with the claims, the claims prevail.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not fully determine the invention's scope.

FIG. 1 is a flow chart illustrating an initial setup method of the present invention.

FIG. 2 is a diagram illustrating a prior art disk state, which is either bare or contains information that need not be preserved on the disk. This is the state of a disk 200 prior to initial setup step 102 of FIG. 1.

FIG. 3 is a diagram illustrating a prior art state of disk 200 immediately after initial setup step 102 of FIG. 1.

FIG. 5 also illustrates the state of disk 200 before either of further setup steps 720, 722 have been performed.

FIG. 6 also illustrates the state of disk 200 after further setup step 726 has been performed, that is, after virtual boot code and environment files (collectively denoted tools 602) have been installed on the disk 200.

FIG. 10 shows the computer's state after the computer 1000 has been booted into a virtual environment rather than the normal boot environment (which may no longer be functional), after at least part of an image 1008 to be restored to disk 200 has been read from the container 600 on disk 200 into RAM 1002, and after recovery tools comprising software 1006 for laying that image 1008 onto the disk 200 have been read from the container 600 into RAM 1002.

DETAILED DESCRIPTION OF EMBODIMENTS

Figure 4:
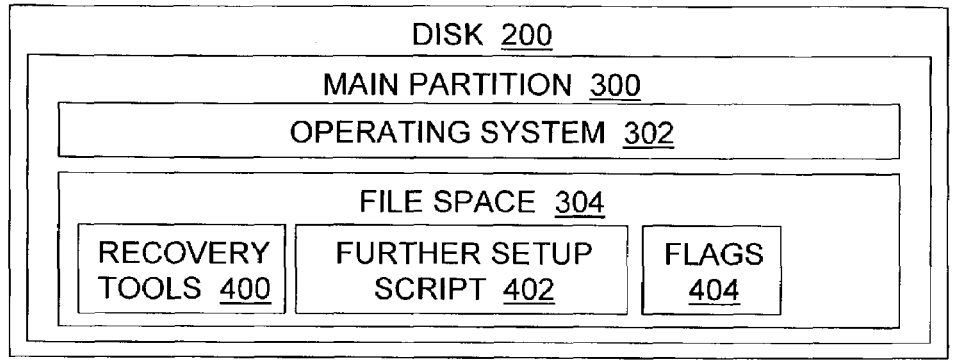
FIG. 4 is a diagram illustrating the novel state of disk 200 immediately after initial setup steps 104 and 106 of FIG. 1.

In describing the invention, the meaning of several important terms is clarified, so the claims must be read with careful attention to these clarifications. Specific examples are given to illustrate aspects of the invention, but those of skill in the relevant art(s) will understand that other examples may also fall within the meaning of the terms used, and hence within the scope of one or more claims. Important terms may be defined, either explicitly or implicitly, above, here in the Detailed Description, and/or elsewhere in the application file.

The present invention provides tools and techniques for disk partition recovery in the absence of any formatted or bootable conventional partition on the system, without CDs and without a network connection to any other system. Using a hot key or boot menu selection, a Virtual Boot Environment (VBE) can be launched and the user can then recover an operating system using a collection of specialized tools.

Initial Setup

FIG. 1 is a flow chart illustrating initial setup methods of the present invention. FIG. 2 illustrates the state of a disk 200 prior to initial setup; the disk 200 is either bare or contains information that need not be preserved on the disk. During an installing step 102, an operating system and a corresponding file system are installed on the disk 200. Step 102 is well known in the art, and is routinely performed by vendors in-factory, such as by manufacturers and/or OEMs (Original Equipment Manufacturers) who routinely prepare many computers for shipment. But step 102 and other steps of FIG. 1 may also be performed by someone working on fewer machines, or on a single machine. The methods 100 may be performed by a network administrator, a technician, a hobbyist, or another individual not working in a computer factory, or it may be performed by vendors, manufacturers, or OEMs.

Step 102 results in a disk state like that shown in FIG. 3. At least one partition 300 has been created, such as the so-called "C:" drive partition 300 which is the main working partition typically found on machines running Microsoft Windows-brand operating systems. The partition holds an installed operating system 302, and a file space 304 that is formatted to hold files. The disk state shown in FIG. 3 is well known in the art.

One advantage of the present invention is that the operating system 302 need not have any recovery capabilities. It need not be capable of archiving a partition on a medium other than the disk 200, and it need not be capable of creating or restoring disk images. The invention can also save effort in a factory by avoiding the need to include a recovery CD or networking capability to permit recovery after a partition becomes unavailable due to data corruption or other loss. Instead of being fully configured in the factory, a recovery system can be set up when a further setup script is triggered by the first boot of the computer after the end user configures the operating system.

During a recovery tool adding step 104 and a further setup script adding step 106, the disk state is transformed to resemble FIG. 4. One or more files containing recovery tools 400 are added to the disk 200 by copying them into a recovery directory created for that purpose, or another location. They could also be stored elsewhere on the disk, such as in a reserve area or a hidden partition that is not normally accessible to users; this possibility is reflected in FIG. 10 by the omission of a partition box and a file space box around the recovery tools in that Figure. The further setup script can be set at the operating system's root by either adding a new script file (which may replace an existing one) or by modifying a previously added script file. Flags 404 to control recovery may also be added, e.g., by creating one or more files having specific predetermined names and interpretations as discussed herein.

In one embodiment, the recovery tools 400 comprise PowerQuest V2i Protector software, software implementing a "virtual disk system" as discussed herein, software implementing a "virtual boot environment" as discussed herein, PowerQuest VF editor software, PowerQuest PQIDply-D.exe software, PowerQuest MbrBackNT.exe software, PowerQuest PQAccD.exe software, PowerQuest RTC files, and recovery scripts as discussed herein. These specific tools are discussed further below. However, any software having the functionality required to practice the claimed invention may be used; lack of infringement does not automatically follow from the failure to use any one or more of the specific recovery tools identified herein.

PowerQuest V2i Protector™ software is a point-in-time backup and disaster recovery solution commercially available from PowerQuest. V2I and V2I PROTECTOR are marks of PowerQuest Corporation of Orem, Utah, USA.

The "virtual boot environment" (VBE) comprises software for running pre-boot code other than an operating system that is already installed on a computer system. As discussed in U.S. patent application Ser. No. 09/788,191, a virtual floppy image or other image is loaded from a file or other location on disk and run before or in place of the pre-boot code that would be loaded using a standard boot process. In one embodiment, the virtual boot environment is installed with a virtual disk system service using a Virtual Floppy Disk file, which is a file having extension VFD that is editable with the PowerQuest VF editor.

To avoid confusion regarding terminology, the following discussion may be helpful. The virtual boot environment and virtual floppy are tools 602 that involve I/O device redirection, with sector lists in an initial program loader, so the operating system operates as though reading from a boot floppy even though it is reading from the hard disk. This virtual boot technology has been commercially available from PowerQuest for more than a year prior to the filing of the present application.

A Virtual Disk System (VDS) extends the virtual floppy technology, e.g., by providing a vdisk system service which locks the container in place. The Virtual Floppy Disk file of the Virtual Disk System contains a DOS level driver that attaches to a container file 600 during performance of a recovery method according to the present invention. Sector lists are stored in files and can be accessed from the disk even when a working file system is not present. More generally, the VDS includes a device driver which reads container location sector lists 502 from disk and then satisfies I/O requests by reading from the disk from container 600 as requested. The VDS can run without running the virtual boot environment. The VDS mounts the container as another drive. A device driver for Linux or another operating system could be used instead of DOS. The DOS VDS device driver was provided by PowerQuest to IBM as early as June 2002.

The PowerQuest VF editor software, which is commercially available from PowerQuest, allows users to edit files to control the virtual disk system.

PowerQuest PQIDeploy software is commercially available in versions for DOS (PQIDplyD.exe) and for other operating systems (Microsoft Windows-brand operating systems, Linux-brand operating systems). PQIDeploy software is imaging software with command-line interfaces rather than GUIs, making them suitable for use in configuration centers, system builder production lines, and so forth. PQIDeploy was previously available from PowerQuest under the product names "ImageCenter" and "Drive Image® Pro". RTC files are runtime configuration files supplied for PQIDeploy software, which can provide password control, expiration date settings, and/or BIOS locking capabilities.

MbrBackNT.exe software is a utility that stores a backup copy of the boot sector 0 to sector 53. It is commercially available from PowerQuest Corporation.

PowerQuest PQAccess software is commercially available in versions for DOS and other operating systems. PQAccess software is a scriptable command line utility for accessing individual files and complete directories on partitions that are not normally accessible to the active operating system. For example, PQAccess software can be used to copy files from an NTFS partition to a DOS partition while DOS is running from the DOS partition.

Note that steps 104 and 106 may be performed in an order different than the order shown in FIG. 1. As with all flowcharts provided herein, in a given embodiment the steps of the flowchart in FIG. 1 may be grouped differently, reordered (except to the extent that one step requires results of another step), repeated, omitted, performed concurrently, and/or renamed, to the extent that doing so still provides an operable embodiment consistent with the claims. For instance, some initial setup methods of the invention end after steps 104 and 106 are completed, such as methods that ultimately help configure only a single machine.

Other initial setup methods continue, by performing a SYSPREP execution or other step 108 as needed to prepare to create a disk image of the disk 200 after the recovery tools and further setup script have been placed on the disk. The image is created 110 using familiar methods and tools, such as commercially available PowerQuest disk imaging software; see www.powerquest.com. Then the image—including the recovery tools and further setup script—is deployed 112 onto multiple machines, again using conventional means. Finally, the machines are boxed and shipped 114 to users, thereby completing those initial setup methods that continue after steps 104 and 106.

Further Setup

FIGS. 5 through 8 help illustrate additional steps which set up recovery mechanisms according to the present invention. These steps presume that initial setup steps 104 and 106, at least, have already been performed. The initial setup method of FIG. 1 and a further setup method of FIG. 7 or FIG. 8 could be performed at one time by the same entity or individual, as a single continuous setup method. However, initial and further setup may also be performed as two methods which are performed by different entities or individuals, as suggested by the use of separate Figures. For example, the initial setup could be performed in a factory by a manufacturer or OEM, after which the further setup is performed at a customer site by a technician or an end user.

Figure 7:
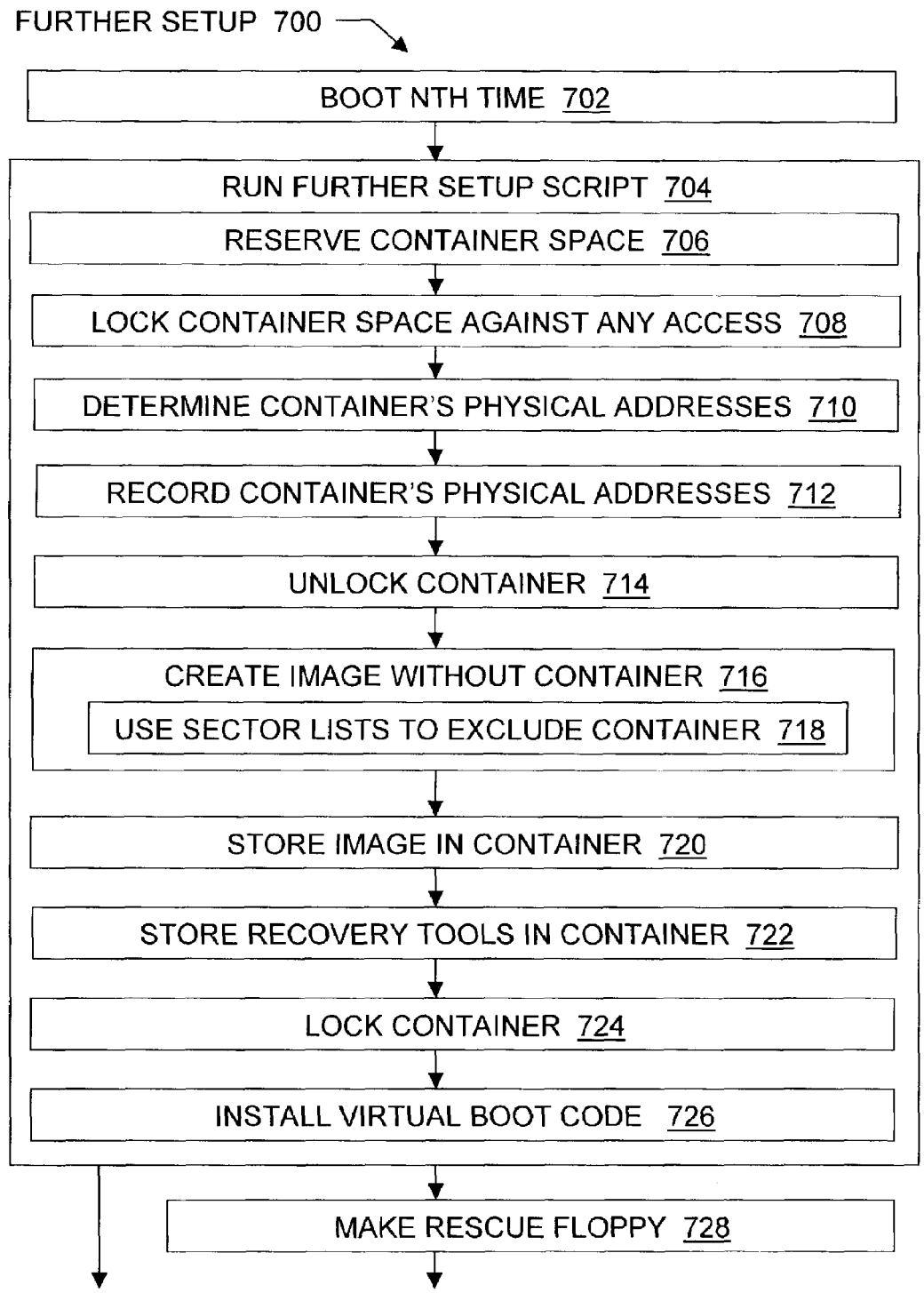
FIG. 7 is a flow chart illustrating a further setup method of the present invention, which follows an initial setup according to FIG. 1. The further setup of this Figure may be performed by a different person or entity than the one who performed the initial setup.

FIG. 7 illustrates a further setup method which follows an initial setup. During a booting step 702, the end user (for instance) causes the Nth boot of the computer which was initially set up according to a method of FIG. 1. Flags 404 may be used to determine the value of N. To perform further setup the first time after initial setup, for instance, the further setup script 402 can check for the presence of a file having some predetermined name, and perform the further setup if the file is found; the file will be removed at the end of a successful execution 704 of the further setup script 402. For values of N greater than 1, a countdown variable may be kept in a file and decremented on each successive boot until it reaches zero, after which the further setup will be executed to completion.

During a further setup space reserving step 706, space 500 is reserved on disk 200 to hold a container 600. The container must be large enough to hold the recovery tools 400 and the disk image 1008 that will be installed onto the disk 200 to effect the recovery. The tools 400 may be part of the image 1008. Implementation may be simplified if the container is a single block of contiguous sectors, but non-contiguous images (those stored in sectors which are not all contiguous) may also be accommodated in some embodiments.

Figure 5:
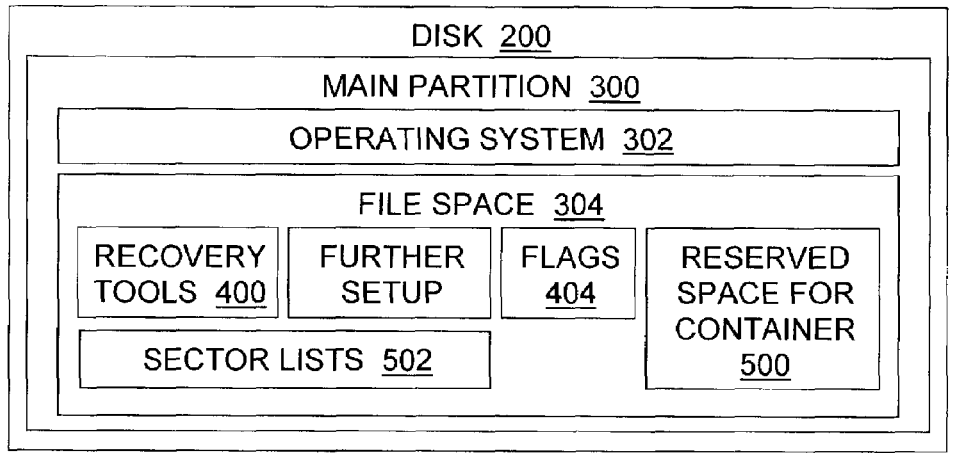
FIG. 5 is a diagram illustrating the novel state of disk 200 after at least further setup steps 706 and 712 of FIG. 7 or FIG. 8 have been performed, that is, after container space has been reserved and sector lists have been created recording the reserved space's physical location(s).

In a presently preferred embodiment, the container is reserved 706 by allocating it in the file space 304 as shown in FIG. 5. It is allocated within the operating system 302 disk space allocation structures such as a File Allocation Table, Master File Table, sector allocation map, vnode, or the like. In such embodiments, the container 600 is visible to end users as one or more files. Unlike other files visible to end users, however, the container 600 file(s) are locked so that they cannot be deleted, moved, defragmented, overwritten, or otherwise rearranged by a typical end user during normal operation.

Figure 10:
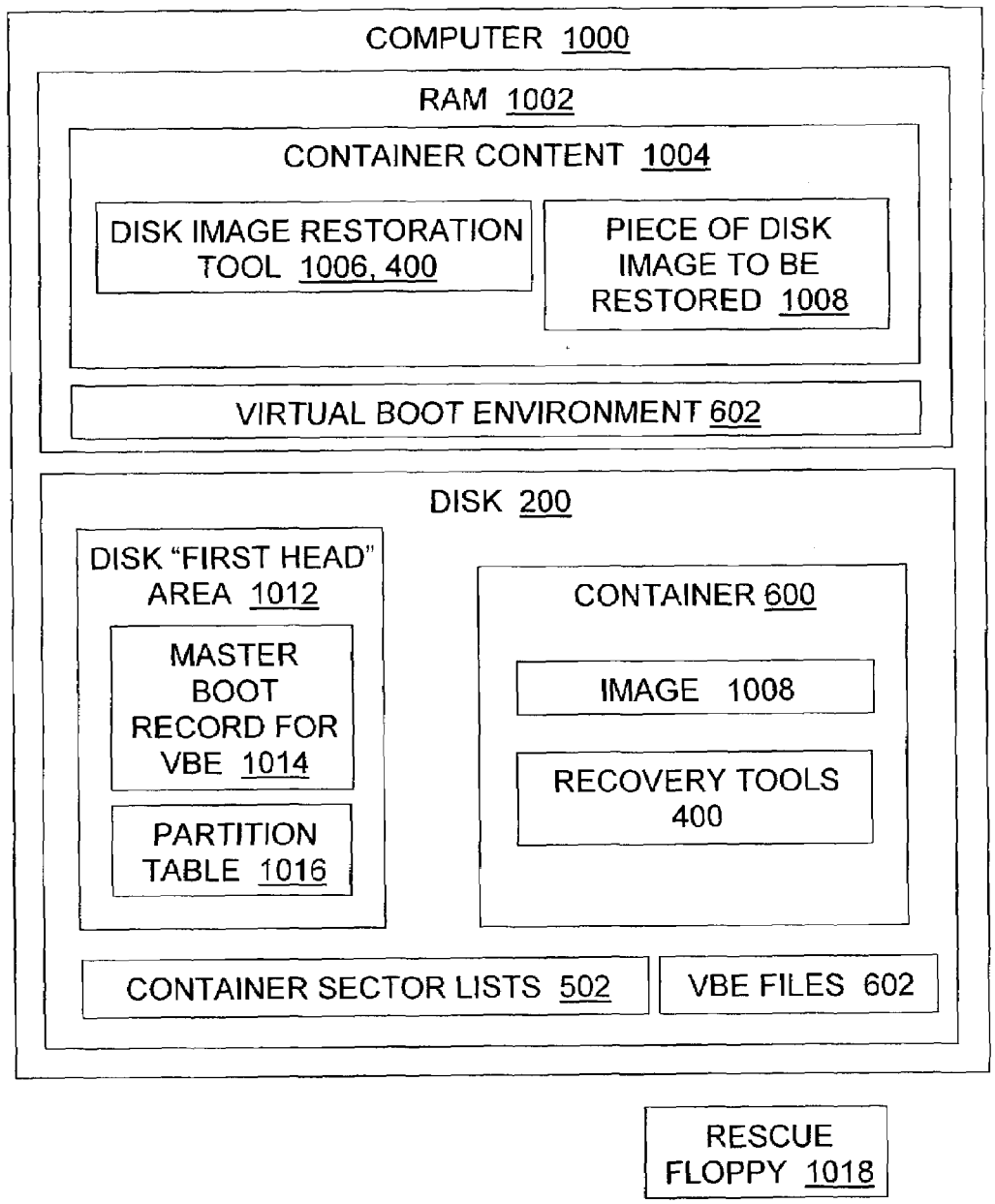
FIG. 10 is a diagram illustrating a computer 1000 with memory configured according to the present invention, after at least recovery steps 906, 912, and 914 have been at least partially performed. That is.
Figure 11:
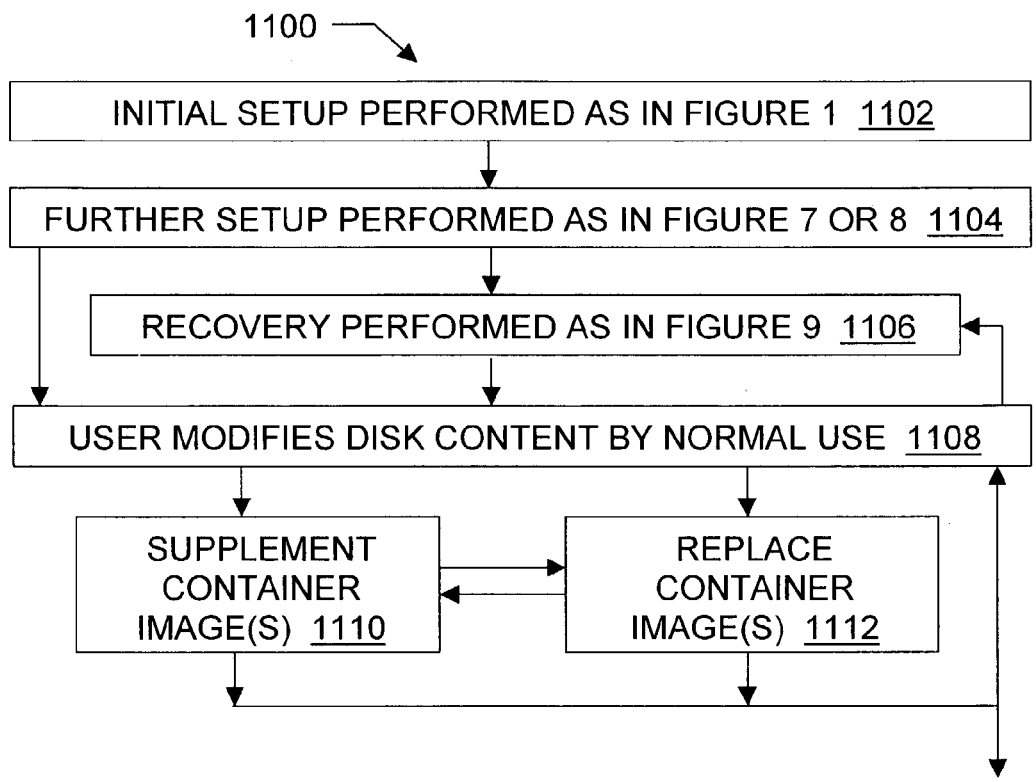
FIG. 11 is a flowchart illustrating container image modification methods of the present invention.
Figure 12:
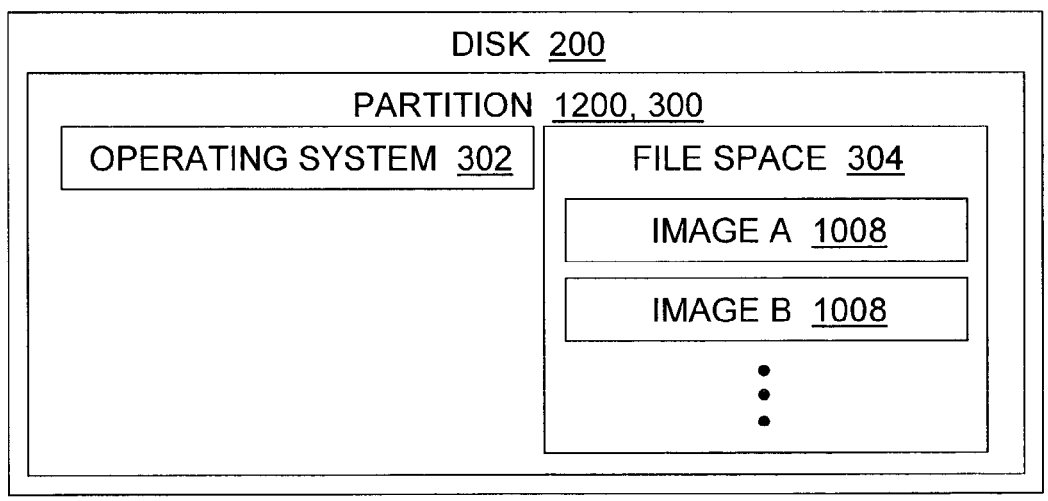
FIG. 12 is a diagram illustrating the state of disk 200 after performing a container image modification method according to FIG. 11.
Figure 13:
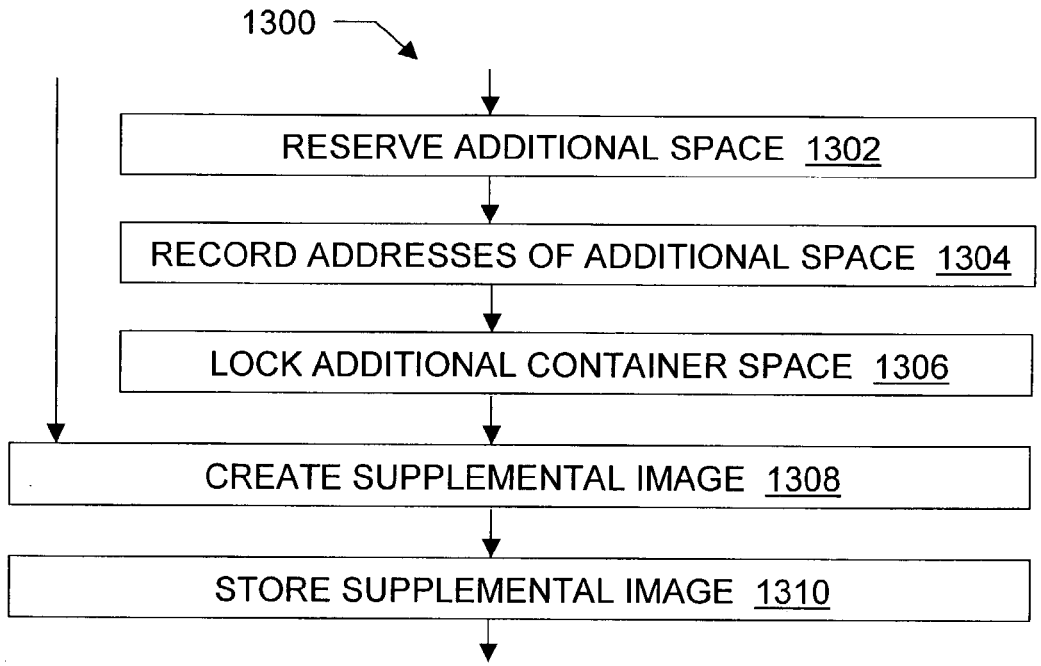
FIG. 13 is a flowchart further illustrating certain container image modification methods of the present invention, namely, methods which supplement the image(s) stored in the container(s) on disk.
Figure 14:
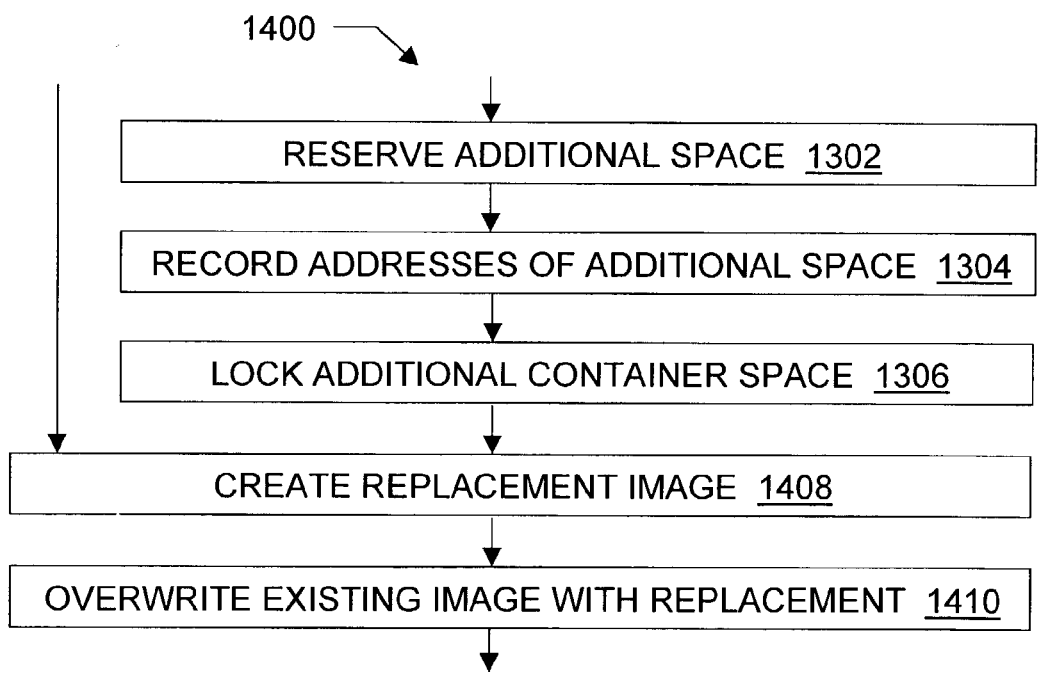
FIG. 14 is a flowchart further illustrating other container image modification methods of the present invention, namely, methods which replace the image(s) stored in the container(s) on disk.

In alternative embodiments, as illustrated in FIG. 10 the container 600 is not necessarily stored fully in the file space 304 but is instead stored partly or entirely outside that space 304, although it is still stored on the disk(s) 200 attached to the computer 1000. For instance, the recovery image(s) 1008 and/or the recovery tools 400 can be stored on disk(s) 200 in a reserve area or a hidden partition that is not normally accessible to end users. The computer 1000 may be a workstation, laptop, or other computing device with a hard disk, RAM, and processor. Hard disks 200 need not be mechanical devices in every embodiment; they may also be implemented in flash or other memory chips in some cases. They are nonvolatile mass storage devices attached to the computer 1000; a network connection is not required for the computer 1000 to access its disk(s) 200.

During a locking step 708, the reserved container space 500 is locked to prevent access to it by any process, task, thread, or other code execution. This would prevent write access by later steps of the FIG. 7 method, so the space 500 is unlocked 714 long enough to receive 720 the image and to receive 722 the recovery tools, before being locked 724 again. In some cases the step 722 of storing recovery tools is part of the step 720 of storing the image, because the recovery tools were part (but not all) of the imaged portion of the partition 300. Even if the steps 720 and 722 are performed in a non-overlapping manner, the order shown in FIG. 7 is not required in every case, a point which is emphasized by showing these steps in the reverse order in FIG. 8.

Figure 8:
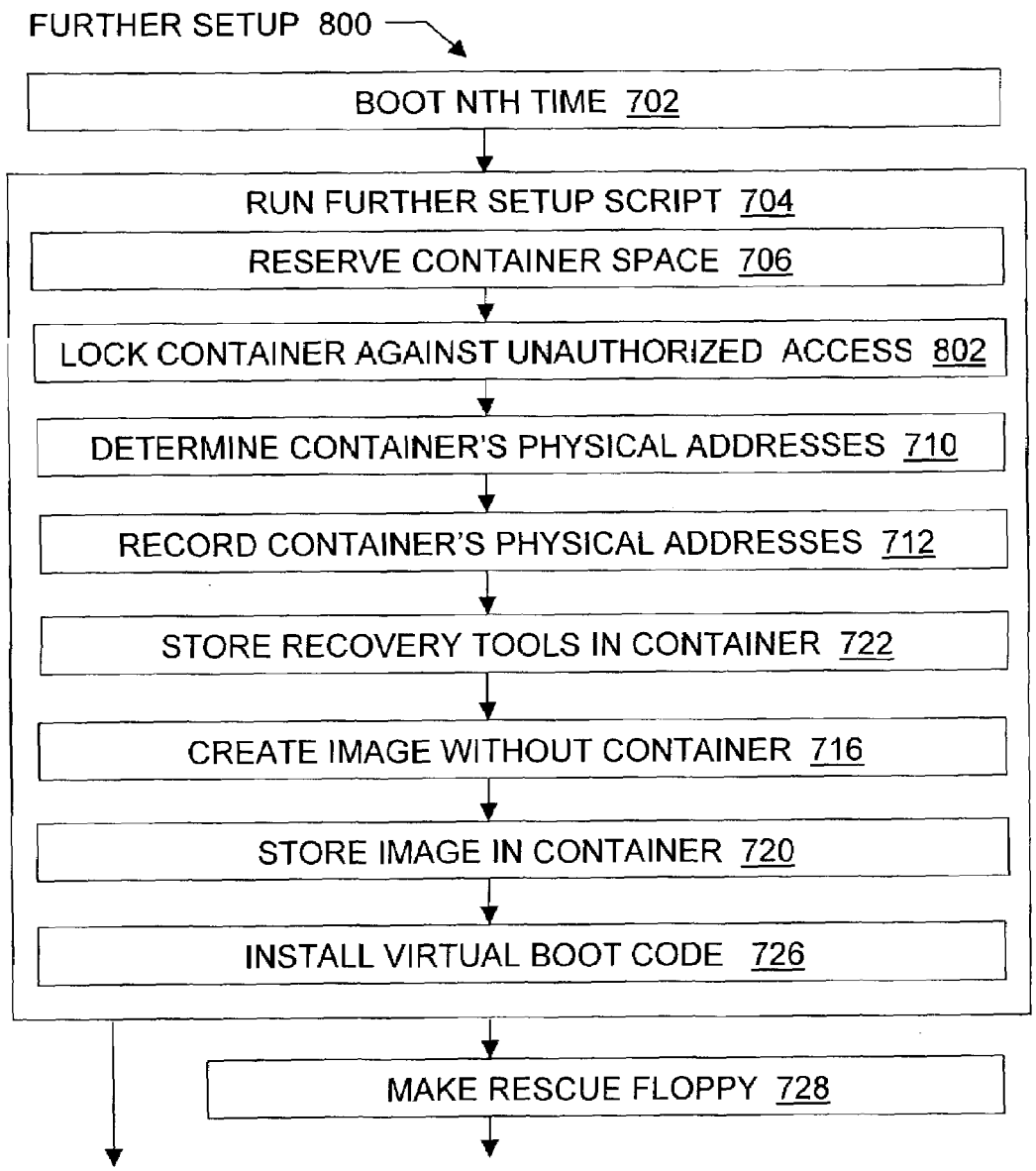
FIG. 8 is a flow chart illustrating an alternative further setup method of the present invention. The further setup of this Figure follows an initial setup according to FIG. 1, and it may be performed by a different person or entity than the one who performed the initial setup.

An alternative locking approach is also illustrated in FIG. 8. The container space is locked 802 only against unauthorized accesses, which allows write access by the authorized code which stores 722, 720 the recovery tools and the image in that space but prevents other write accesses to the space 500. Which locking approach is used in a given embodiment depends in part on which type of mechanism the operating system 302 provides to guarantee exclusive file write access, at least in embodiments that store 720, 722 the container's contents in the file space 304 which is managed by that operating system 302. Those of skill will readily identify and implement code to permit storage of the image and recovery tool content in the container and to protect the integrity of that content, in a given operational environment.

During a determining step 710, the physical addresses of the container's sectors are determined. The physical addresses in question may be <head, cylinder, sector> value triplets, or they may be single-value "logical" addresses that increase consecutively from some specified physical disk location as one traverses the disk(s) 200 in a predetermined manner. The addresses denoting the location of the container 600 should be "physical" in the sense that they are not relative to any mere data marker on the disk 200, such as a cluster chain or an address in a partition table, because mere data markers may have been lost or corrupted when the physical addresses are needed to locate the container 600. The physical addresses may be relative to some predetermined physical boundary, such as the edge of the disk 200, because such a physical boundary will still be locatable if the partition 300 is corrupted or lost.

The inventive recovery preferably fails only if there is a hardware failure (e.g., the disk won't spin up) or if the container 600 content itself (not merely surrounding files, partition tables, etc.) has been wholly corrupted or otherwise lost. A partial hardware failure due to limited bad sectors is considered an example of data corruption or loss for purposes of the present invention. It may be possible to use the invention in some situations to at least partially restore a working partition, even if not all of the files in the image are successfully restored, if the bad sectors do not destroy the functionality of the recovery tools 400, critical portions of the image 1008, or the sector list, for instance. This would require use of an image restoration tool which continues image restoration after encountering a bad sector. Many commercially available image restoration tools do not continue image restoration when a bad sector is encountered, but attempt instead to undo whatever restoration has been done before that occurs.

During a recording step 712, the container's one or more physical addresses are recorded as one or more sector lists 502, or equivalently, as cluster lists. It is not necessary to expressly record each sector's address to identify the container's location; if the container is a single contiguous block of sectors then recording 712 the container's beginning physical address and its ending physical address is sufficient. Even a single physical address would be sufficient if the size of the container is known. A sector run or cluster run format could be used, e.g., by recording the container's beginning physical address and the number of contiguous sectors reserved for the container from that address onward. For convenience, these various data structures are each referred to in the claims as a sector list even though they may identify clusters, cluster runs, sector runs, etc. Regardless, at least one container physical address is recorded 712 in a location on the disk(s) 200 which can be located even if the partition table, File Allocation Table, and/or other file system/operating system data has been corrupted or overwritten.

FIG. 5 illustrates the state of disk(s) 200 after steps 706 and 712 of FIG. 7 or FIG. 8 have been performed, that is, after container space 500 has been reserved and sector lists 502 have been created recording 712 the reserved space's physical location on the disk(s) 200. As noted above and shown in FIG. 10, the reserved space 500 is not necessarily inside the file space 304, although placing the recovery container 600 inside the file space is presently preferred because users may then be informed and reassured by seeing the recovery container's file name and size displayed when they do a directory listing. FIG. 5 also illustrates the state of disk 200 before either of further setup steps 720, 722 have been performed; those steps store recovery tools 400 and the recovery image 1008 in the reserved space 500.

During an imaging step 716 (also known as an image-creating step 716), an image of the disk(s) 200 in their current state is created. This may be done using familiar imaging tools and techniques, modified or supplemented as discussed herein. In particular, the reserved space 500 is not part of the final image.

In one embodiment, the container space 500 is excluded from the recovery image 1008 as follows. A first used sector list is created during step 716 by querying the operating system 302 or by traversing the file system allocation structures that are maintained by the operating system's file system code. If the reserved space 500 is within the file space 304, then the reserved space will be considered by the operating system 302 to be part of the allocated space and will therefore be included in the used sector list that is obtained from the operating system 302 and/or obtained from analysis of its file system structures. In a conventional imaging operation, that used sector list would be transformed into a bitmap, cluster map, or other mapping that shows the used sectors, if the operating system did not provide such a mapping directly. The imaging software would then employ the used sector bitmap to determine which sectors to actually read data from into the disk image being created; omitting reads of unused sectors saves time.

In some embodiments of the invention, however, the sector lists 502 that specify the physical addresses of the reserved space 500 are logically subtracted 718 from the initial used sector bitmap to form 718 the final used sector bitmap that is employed to determine which sectors to read into the recovery image 1008. That is, a sector is read into the recovery image 1008 only if it is a used sector from the operating system/file system point of view and it is not in the reserved container space 500. In addition to using container physical addresses 502 to locate 912 the container during a recovery, the presently preferred embodiment of the invention also uses 718 those physical addresses 502 to exclude the container's sectors from the collection of sectors that are read 716 to form the recovery image 1008.

The recovery image 1008 is then written 720 into the reserved space, possibly after being compressed. A checksum, digital signature, and/or other integrity-promoting and/or error-detecting value corresponding to the recovery image may be generated using familiar tools and techniques and stored with the recovery image or elsewhere on disk. The recovery tools are also written 722 into the container 600; to the extent they are part of the image this is accomplished by step 720 rather than a separate step 722. Any space occupied by a previous copy of the recovery tools 400 in the file space 304 can then be deleted, thereby freeing it for other uses such as holding application programs or files generated by users.

Figure 6:
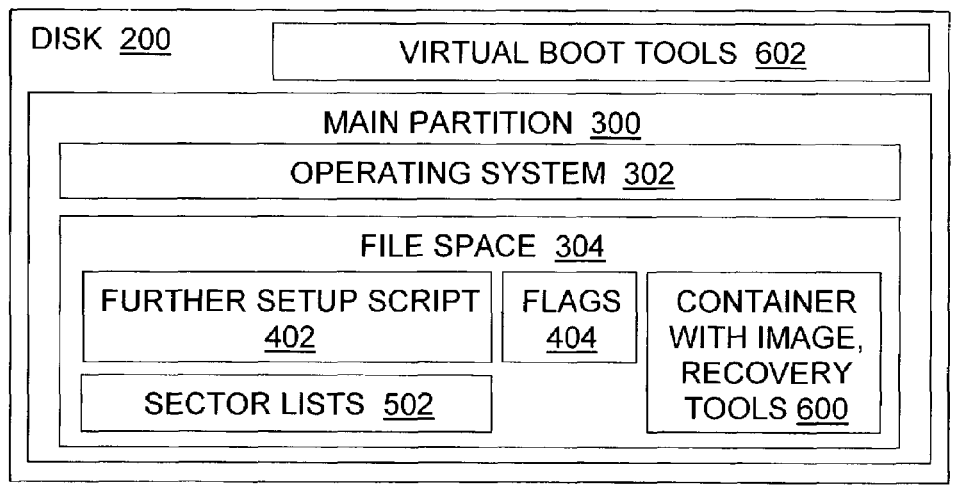
FIG. 6 is a diagram illustrating the novel state of disk 200 after at least further setup steps 720 and 722 of FIG. 7 or FIG. 8 have been performed, that is, after an image and recovery tools have been stored in the container space. The recovery tools may be part of the image.

FIG. 6 illustrates the state of disk(s) 200 after steps 720 and 722 of FIG. 7 or FIG. 8 have been performed, that is, after the recovery image 1008 and recovery tools 400 have been stored in the container space. FIG. 6 also illustrates the state of disk 200 after further setup step 726 has been performed, that is, after virtual boot tools 602 have been installed 726 on the disk 200.

In one embodiment, the further setup method 700 operates as follows to set up recovery mechanisms once the system 1000 is booted by an end-user. Upon first boot 702 (or optionally if the OEM so desires, on second or later specified boot 702), a further setup sequence is started from the autoexec.bat file 402 or another script file. It sets a flag 404 and launches Vfile.exe and the virtual disk system (VDS) container file Vdisk.dsk 500 is automatically created and the corresponding sector lists 502 describing the container's location are written to disk 200. The VDS container file 500 is a block file that is used to store the image 1008 and to store recovery tools 400 which can be used to restore the factory image or a modification thereof to the system 1000. The V2i Protector software is then launched and it takes 716 a one time, hot image 1008 of the operating system 302 and the rest of partition 300 in its clean state. This image is taken minus 718 the physical sectors where the container files are located, which is done by getting the container physical address information from the sector lists 502 and excluding those container sectors from the used sector bitmap that V2i Protector software uses to select sectors to read from the disk 200 into the image 1008. The image of the operating system 302 with the recovery tools (e.g., PQID-plyD.exe, PqAccD.exe, RTC files, recovery scripts and the flag system) is written 720, 722 to the container 600 by vfile.exe; in this embodiment all the recovery tools 400 are included in the image within their recovery directory.

The VDS service (VFInstNT.exe) is then restarted 724; it will start and run with each boot of the operating system 302, at least for Windows NT, Windows 2000, and Windows XP brand Microsoft operating systems. VFInstNT.exe intercepts all system file access attempts; it is registered as a service with the operating system. The container 600 is not allowed to be moved, even by a disk defragmenter, and is not allowed to be deleted by normal user file operations. With other operating systems, other file access control mechanisms can be used to lock the container 600, e.g., a daemon could be used on machines running Linux-brand operating systems to provide system-level exclusive access to container files 600. Any multi-tasking operating system will normally have some similar mechanism to provide exclusive file access to an authorized process, task, thread, or other code.

The virtual boot code 602 is copied to the first sector of the first head 1012 of the hard drive 200 and corresponding virtual environment files 602 are copied to the hard drive 200. A backup copy of the boot sector 0 is then made to another sector on the first head of the hard drive 200.

The VDS service 400 writes out 712 the sector list files 502 that are used to map the sectors where the container file 600 is physically located. Then the first sector list is mapped into the first head 1012 by storing a pointer in the boot sector (sector 0) that points to the first list written in free sectors, such as the first free sectors after sector 17. Different embodiments may use different free sectors. Generally, each sector list maps to the next until the physical location of the container file is identified. The sector lists are obtained by making calls to the operating system for the physical sector location upon the start of the VDS service. The VDS service locks the container file in the same physical sectors where it was created by Vfile.exe. The container file 600 won't be movable, even by a disk defragmenter, and won't be deleted by normal user file system operations. The VDS service enables 726 VBE in the first head 1012 of the hard drive 200 at the boot sector 0. The container file 600 is now populated; it holds the recovery image 1008 of the operating system and the PowerQuest (or other authorized vendor) recovery tools 400. MbrBackNT.exe is then launched, and it stores a backup copy of the boot sector 0 to sector 53.

Although specific data structures, pieces of software, sequences, and other implementation details are provided here to help illustrate the invention, those of skill will recognize that a wide variety of other implementations are possible even if one limits attention to Microsoft Windows-brand operating system environments. It will also be recognized that the invention is not limited in every embodiment to Microsoft Windows-brand operating system environments, and that other environments such as Linux environments will also support implementation of the methods illustrated and claimed herein.

Rescue Disk

An advantage of many embodiments of the invention is that secondary recovery media are not required, because the recovery tools 400 and image 1008 are stored on the disk 200 and the virtual boot environment 602 makes it unnecessary to have a separate bootable medium in order to run the recovery tools.

To permit recovery despite corruption or damage in the MBR 1014 and/or the partition table 1016, an optional rescue floppy 1018 can be created 728. Corruption requiring use of a rescue floppy will be evident, for instance, if the user selects 902 a recovery boot and the machine fails to boot. Booting 904 from the rescue floppy 1018 runs 904 code that will restore the MBR 1014 and the partition table 1016. The recovery 900 can then proceed.

When booting 904 from the rescue floppy 1018, the existing boot sector on disk 200 is compared to a back-up boot sector. If the two do not match, the existing first head 1012 is overwritten with the original first head data that is stored on the floppy 1018 as it existed when it was created 728 during the further set up 700/800. This protects the system 1000 even if the entire first head 1012 is modified by a virus.

During optional rescue floppy creation step 728, the end user is prompted for a floppy disk or other secondary medium; although other media such as CDs and Iomega ZIP-brand disks can be used instead of a floppy disk, for convenience every secondary rescue medium 1018 is referred to in the claims as a rescue floppy.

This option can also be set for end users to upgrade to a full V2i Protector product so that they can make recovery CD's as the system grows, or for creating the rescue floppy to CD instead of floppy if the system has a CD writer. Upgrading to a full version of V2i Protector software gives the end user the ability to make more current recovery CD(s) for the system throughout the life of the computer. This also enables the end user to make bootable recovery CD(s).

However, an advantage of many embodiments of the invention is that recovery CDs or other secondary recovery media are not required because the recovery tools and image are stored on the disk 200 and virtual booting is used to make a separate bootable medium unnecessary to run the recovery tool that lays the recovery image onto a corrupted partition 300. In the claims, the hard disk is understood to be the computer's primary storage medium. The computer's RAM 1002 is not considered a secondary storage medium, but removable storage media such as floppies, CDs, Iomega ZIP-brand disks, and portable USB drives (unless the USB drive is the machine's only hard disk) are considered secondary media. Media that are only accessible to the computer over a network connection are also secondary media.

The end user can be shown a slide show of PCX files (either OEM inserted or default PowerQuest slides, for instance) while the rescue floppy 1018 is formatted and created using Caldera DOS version 7.06 or another suitable small operating system. PCX is a file name extension used to identify a graphics file format for graphics programs running on PCs. Originally developed by ZSOFT, this format is now widely supported.

In one embodiment, the rescue floppy contains the following files:
IBMBIO.COM
IBMDOS.COM
COMMAND.COM
AUTOEXEC.BAT
AUTOEXE2.BAT
CONFIG.SYS
CHKDSK.EXE
DISPLAY.SYS
EGA.CPI
KEYB.COM
MODE.COM
NWCDEX.EXE
FDISK.COM
HIMEM.SYS
RESCUE.BAT
MBRBACKD.EXE
MBRUTILD.EXE AUTOEXE2.bat can be used to launch CD-ROM drivers or other processes per the OEM. MBRBACKD.EXE was discussed above. MBRUTILD.EXE can be used to save or restore the MBR; it is commercially available from PowerQuest.

In one embodiment, a RESCUE.BAT script invoked from an AUTOEXEC.BAT script contains the following text:

```
MbrBackD.exe /compare
        if errorlevel 1 goto Restore
        if errorlevel 0 goto reboot
:Restore
        MbrBackD.exe /restore
        if errorlevel 1 goto MBR
:MBR
        MbrUtilD.exe -rh=a:\mbr.dat
        Echo Reboot the system to start the OS
        Echo If the OS does not start correctly, Reboot
and press F10
        echo to start the recovery console.
        goto end
:reboot
        Echo Reboot the system to start the OS
        Echo If the OS does not start correctly, Reboot
and press F10
        echo to start the recovery console.
:end
```

In one embodiment, when booting 904 with the rescue floppy 1018 the existing boot sector (0) is compared to the back-up in sector 53 on the hard drive; other embodiments may use other available sectors. If the two boot sector versions do not match, the existing first head 1012 is overwritten with the original first head data that is stored on the floppy that was created during the initial set up stage 100 or further setup stage 700/800. A message is then displayed on the screen instructing the user to reboot the system. If it does not reboot to the operating system correctly, then at least the option to reboot and start the recovery process is functional. This protects the system even if the entire first head (e.g., sectors 0–63) is wiped out by a virus. The VDS recovery solution discussed herein will work without the rescue floppy option, but will be susceptible to MBR 1014 corruption or damage if the rescue floppy 1018 is not available for use 904. With the rescue floppy the MBR may be entirely overwritten and the recovery system will still function. The decision whether to mandate this to the end user or not can be made by the OEM.

The rescue floppy can be imaged using PowerQuest VF editor so that it can be used to recover servers in an enterprise domain by storing the rescue floppy created for the server in a VFD file that can then be PXE booted with PowerQuest DeployCenter PXE software, for instance. PXE is an acronym for Intel's Preboot Execution Environment standard, which specifies a minimum level of functionality a boot ROM must supply to an initial program load or a bootable image. PXE allows a workstation to boot from a server on a network prior to booting the operating system on the local hard drive. The rescue floppy VFD is machine specific. This would provide recovery from a damaged non-bootable first head 1012 back to a recovery environment by allowing the rescue operation to function from a PXE boot menu in the event that the head of the first hard drive is overwritten (sectors 0–63) or infected by a virus or corrupted. A regular recovery 900 then could be made using steps 908 onward as long as the VDS system is installed and running on the server 1000.

In the case of a downed server, it may be faster to restore the base operating system of the server 1000 using the present invention instead of restoring a full current backup, because the base image is local and smaller. Once the factory or base operating system is restored and used to reboot the server, imaging tools such as PowerQuest V2i software can be used to restore a larger and more current image onto the server.

Recovery

Figure 9:
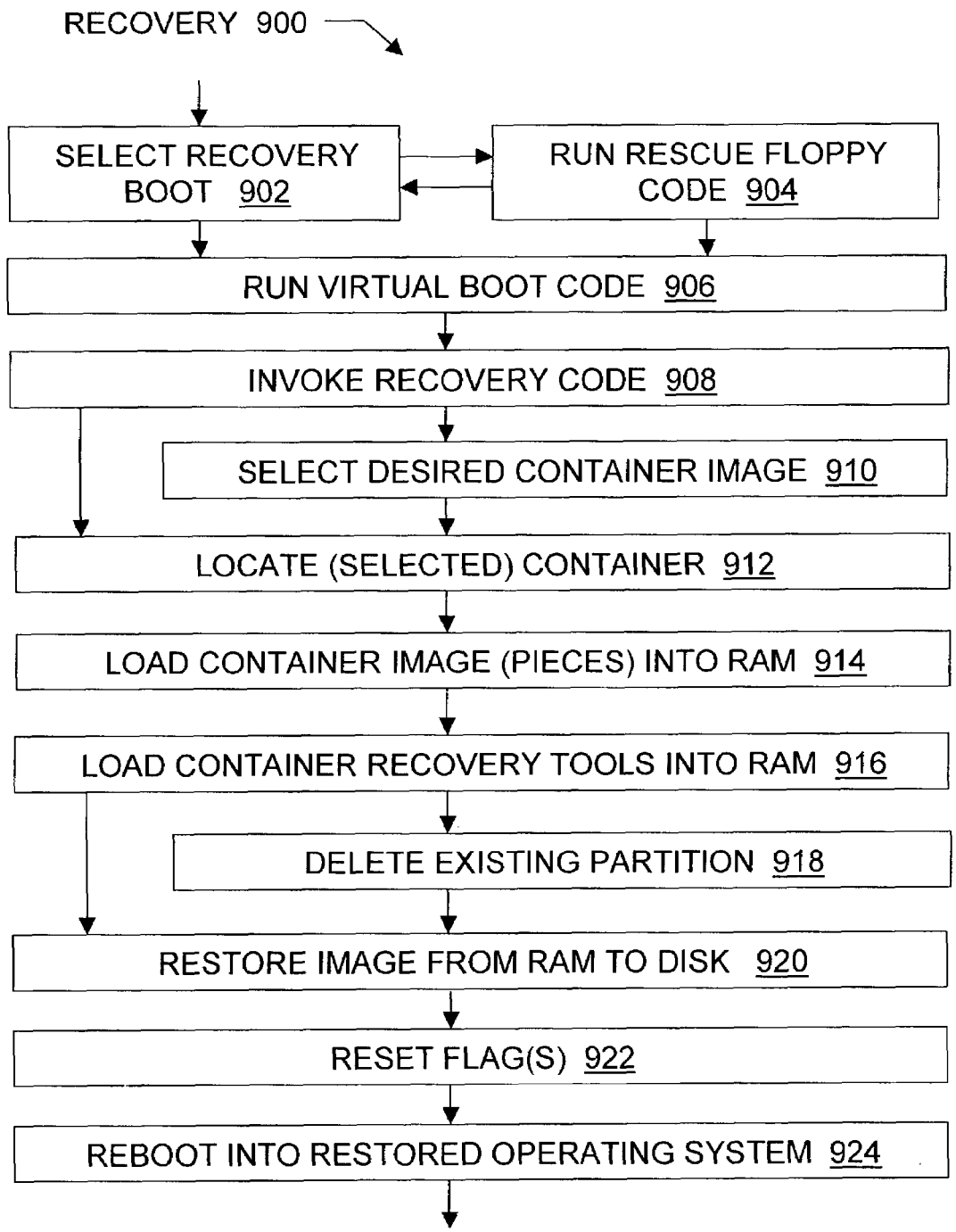
FIG. 9 is a flow chart illustrating a recovery method of the present invention, which follows an initial setup according to FIG. 1 and a further setup according to FIG. 7 or FIG. 8. The recovery of this Figure may be performed by a different person or entity than the one(s) who performed the setups.

FIG. 9 illustrates recovery methods 900. These methods can be performed using recovery mechanisms that are set up using the methods shown in FIG. 1 and in FIG. 7 or FIG. 8. The recovery can take place even if there are no working partitions left on the drive 200. To begin an operating system recovery method, the end user selects 902 the corresponding hot key from the boot menu during the boot of the machine 1000. The hot key can be set by the OEM; a default is the F10 key. If the MBR is damaged such that the recovery boot 902 does not function, the rescue floppy 1018 is inserted to modify the first head 1012 as discussed above; in some embodiments the rescue floppy also boots to run 906 the virtual boot environment; otherwise the virtual boot code installed 726 on the disk 200 runs 906 after a reboot 902 with the repaired (or undamaged) MBR. The virtual boot code loads 908 a version of DOS or some other small disk operating system from the virtual floppy disk file which boots the system 1000 to the virtual boot environment 602.

The virtual boot environment calls 908 the PowerQuest Vdisk.sys driver or other virtual disk system code which walks the sector lists created by VFInstNT.exe or its functional equivalent. One such driver to read sector lists and then read the container contents was provided to IBM by PowerQuest at least as early as June 2002. In one embodiment, the first sector marker is in the first head 1012. It points to the sector list files 502 that point 912 to the physical location(s) 500 where VFInstNT.exe originally locked the container file 600. If there are multiple container files, the user can be presented with a list of them and select 910 one using the keyboard. The located 912 container file is then mounted 914 and given the next available operating system drive letter or other storage device designator, and/or otherwise opened for reading. The container file 600 itself should be read only to reduce the risk of inadvertent or malicious changes to the image 1008, but the PowerQuest or other authorized recovery tools 400 do need to be able to write back to the drive 200 from which they are launched, to install the recovery image 1008 read from the container 600. A RAM 1002 drive is launched from the VBE Config.sys at this point to hold content 1004 read from the container 600. The RAM drive can be up to 1 Gigabyte in size, or larger or smaller in some embodiments, dependant on space available in the computer's volatile memory 1002 and capabilities of the RAM drive software. The recovery tool files 1006 are then copied 916 into the RAM drive. Whether the entire image 1008 will fit into memory at one time depends on the size of the RAM available and the size of the image 1008. If the image 1008 is too large to fit completely in memory 1002, it can be read in piece-by-piece and deployed to the disk 200 in alternating read-write operations instead of being read in all at once and then written back out in one continuous write operation.

As with the other method Figures, steps illustrated in FIG. 9 may be performed in a different order except as constrained by one step's need for the results of another step. Steps may be renamed, regrouped, omitted, and/or otherwise varied subject only to operability and the constraints required by the claim in question. For instance, recovery tool loading 916 may be part of image loading 914 if the recovery tools are part of the image, and step 916 may otherwise precede step 914 instead of following it as shown. As a contrasting example, a container must be located 912 before its contents can be loaded 914 into RAM.

After the VBE 602 is loaded in response to the Master Boot Record code 1014, the recovery deletes 918 from the drive 200 the current partition 300 containing the operating system, if there is a current partition 300; this may be done expressly, or implicitly by overwriting the partition table from an image 1008. The partition table 1016 is updated or fully overwritten with good data. The recovery image 1008 created 716 during the user-operated further set up stage is restored 920 onto the drive 200. The flag 404 is reset 922 using PqAccD.exe (for instance) after the operating system is thus deployed 920. The recovery process 900 is then complete; the end user is booted 924 back into a fresh factory defaulted operating system or whatever other operating system is in the image 1008. The further set up stage 700 or 800 can then be repeated.

This recovery solution 900 is repeatable as long as the physical hard drive 200 and other hardware is in good working order. It may facilitate data recovery even if there is limited hardware failure, such as bad sectors, in some cases. In the event of complete hard drive failure the OEM could replace the hard drive, and deploy the recovery image the same as in the initial setup steps 100.

Although recovery from loss or corruption of data is one purpose for which the methods denoted 900 (and preceding methods such as 100, 700, 800) can be performed, and is perhaps the most likely purpose for using the present invention, it is not necessarily the only purpose. It is possible, for instance, that the operating system in the container 600 differs substantially from the operating system 302 presently installed in the partition 300, so the invention could be used to selectively install a different operating environment on a computer 1000 without using secondary media through CDs or a network connection, even when the presently installed operating system and partition are working fine. Other purposes for the invention may also be apparent to those of skill, and the claims are not limited to uses of the invention for the particular use of recovery from data corruption or other data loss.

Container Image Modification

FIGS. 11 through 14 illustrate methods 1100 for modifying container recovery images by supplementing images and/or by replacing earlier images with images 1008 created later in the disk's life to reflect data changes. An initial setup is performed 1102 as discussed above, and then further setup is performed 1104. Zero or more recoveries may be performed 1106. As the user uses the system 1000, the data on disk 200 is modified 1108. For instance, applications may be personalized, added, or removed; files may be created and changed by the user or by applications; the disk may be defragmented or otherwise optimized; the operating system 302 may be patched or otherwise updated; and so on. If a recovery 900 is performed with an image 1008 that does not reflect all of these changes to the disk 200, then the changes will be wiped out when the image 1008 is deployed to the disk 200. It may then be inconvenient, at best, to recreate the changes that were lost.

Accordingly, the container image 600 may be supplemented 1110 and/or replaced 1112 with an image created later, which reflects more of the disk modifications than the image it supplements or replaces. The supplemental images 1008 may be stored in additional containers, or in the same container if there is enough space, or in an enlargement of the original container 600 if additional space is needed; these possibilities are illustrated generally in FIG. 12. The partition 1200 holding the container(s) and images may be the main partition 300 or another disk partition. At the time the container is located 912, the main partition may be working, or it may be corrupted or wholly lost and hence non-working. The supplemental images may also be stored outside the file space 304 in some embodiments, in locations discussed in connection with FIG. 10.

A method 1300 of supplementing container images proceeds differently according to whether additional space 500 is needed to hold the supplemental image(s). If more space is needed, space is reserved 1302 as discussed in connection with step 706; the additional space's physical locations are determined and recorded 1304 as discussed in connection with steps 710, 712; and the additional space is locked 1306 as discussed in connection with step 708 or 802. These steps are omitted if the container space 500 is already large enough to hold the supplemental image(s). The supplemental image(s) are created using familiar imaging tools and techniques as discussed in connection with step 716, again excluding 718 the container from the image if the space 500 is in the file space 304. The supplemental images may be full images, or they may be incremental images. The supplemental images are then stored 1310 in the container 600. They can be located 912, and a selected supplemental image can be deployed 920 back onto the disk(s) 200 as discussed above. If the supplemental image is an incremental image, then deployment comprises locating and deploying first the necessary predecessor or base images before the selected incremental image is deployed.

A method 1400 of replacing container images proceeds similarly. If the replacement image is larger than the image 1008 it will replace, then the container 600 may need to be enlarged 1302, 1304, 1306. The replacement image is created 1408 as discussed in connection with step 716. It is then stored 1410 in the container 600, overwriting the existing image 1008. The replacement image will typically be a full image (at least with respect to the partition 300) rather than an incremental image.

Configured Storage Media, Systems

Articles of manufacture within the scope of the present invention include a computer-readable storage medium in combination with the specific physical configuration of a substrate of the computer-readable storage medium. The substrate configuration represents data and instructions which cause a computer to operate in a specific and predefined manner as described herein. Suitable storage devices include RAM, rescue floppy disks or CDs, and hard disks or other permanent non-volatile storage devices attached to the computer. Such media are readable by the computer. Each such medium tangibly embodies a program, functions, and/or instructions that are executable by the machine to perform at least one method's steps substantially as described herein, including without limitation hard disks configured to perform a further setup method illustrated in FIG. 7 or FIG. 8, and hard disks configured to perform a recovery method illustrated in FIG. 9. To the extent permitted by law, programs which perform such methods are also within the scope of the invention.

The invention also provides systems, such as systems according to FIG. 10 and systems having an attached disk according to FIG. 5 or FIG. 6. It will be understood that such systems normally include at least one processor for executing code, memory operably connected to the processor, and I/O devices for communication with the user. The systems also include disks configured as a result of, or for use by, programs or methods described herein. For instance, some inventive systems have a configured disk in which a working disk partition has an installed operating system and a file space containing a container that holds a recovery image and recovery tools, and the working disk partition also holds the sector lists, according to FIG. 6. Some inventive systems have a configured disk which has no working partition but still stores a container (either in what was file space or elsewhere) that holds a recovery image and recovery tools, and the disk also holds sector lists, according to FIG. 10. Note that each of these Figures also contains elements not necessarily required in every embodiment, e.g., flags 404 and partition table 1016.

CONCLUSION

At an OEM or manufacturer site, an initial setup method 100 stores recovery tools 400 and a further setup script 402 on a computer 1000. The computer has an operating system 302, but that operating system need not have any recovery capabilities. At the user site later, a further setup method 700, 800 reserves 706 a container space 500 in the file system space 304, creates 716 an image 1008 of the computer's main partition 300, and stores 720 that image in the container 600. The container may be in the imaged partition's file space 304 but is not made part of the image. If the partition is corrupted later, the computer can still be booted using virtual boot code and environment files 602, the image can be retrieved 914 from the container even though the partition around it was partly or fully lost, and the image can then be deployed onto the disk 200 over the corrupted partition, thereby restoring a working partition to the computer unless hardware errors interfere. This recovery can be done without secondary media such as recovery CDs or a recovery floppy, and without a network connection. However, a rescue floppy 1018 can be created and used to recover from MBR or partition table corruption.

Although particular embodiments of the present invention are expressly illustrated and described herein, it will be appreciated that discussion of one type of embodiment also generally extends to other embodiment types. For instance, the description of the methods illustrated in FIGS. 1, 7–9 also helps describe systems like that shown in FIG. 10 which can operate according to those methods, and configured media or system embodiments like those illustrated in FIGS. 5, 6, and 12. Embodiments such as the methods or systems illustrated may omit items/steps, repeat items/steps, group them differently, supplement them with familiar items/steps, overlap them, or otherwise comprise variations on the given examples. Discussion of one type of data structure, such as a list, does not exclude from the invention embodiments that implement claimed functionality using other data structures such as trees, arrays, or tables.

All claims as filed are part of the specification and thus help describe the invention, and repeated claim language may be inserted outside the claims as needed without being deemed new matter.

Any failure to expressly identify a thing as prior art in this document is not an assertion that it is not prior art; readers are assumed to be familiar with the state of the art.

As used herein, terms such as "a" and "the" and designations such as "image", "disk", "address", "locking", and "recording" are inclusive of one or more of the indicated item or step. In particular, in the claims a reference to an item generally means at least one such item is present and a reference to a step means at least one instance of the step is performed.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope to the full extent permitted by law.

What is claimed and desired to be secured by patent is:

1. An initial setup method for a purpose such as facilitating recovery from corruption or other loss of data stored on a computer disk attached to a computer, the method comprising:
　storing on the disk recovery tools which comprise virtual booting code and imaging code, the virtual booting code being capable of booting the computer attached to the disk without requiring any changes to BIOS or disk firmware from an image that was stored on the disk even if the disk has no working, hidden or other partitions at the time the virtual booting code runs, and the imaging code being capable of creating an image of a main working partition on the disk without using a second partition of any kind, storing that image in a container in the main working partition on the disk, and deploying that image back over the main partition's location onto the disk outside the container; and
　storing on the disk a further setup script which when executed will cause the computer to perform steps that comprise: selecting and reserving space from anywhere on the disk in the main working partition for the container; recording on the disk a physical address for identifying the location of the container space;
　creating the image of the main working partition excluding the container space; and storing the image in the container.

2. The method of claim 1, further comprising and followed by the step of creating a master image from the computer, the master image containing the recovery tools and the further setup script.

3. A computer system comprising a processor, RAM operably connected to the processor for executing code and a disk accessible to the processor, wherein the disk is configured by tools and a further setup script; a main partition of the disk is non-working and there are no hidden or other partitions on the disk; the tools comprise virtual booting code and imaging code; the virtual booting code is capable of booting the computer without requiring any changes to BIOS or disk firmware from an image stored anywhere on the disk even though the disk has no working main partition; the imaging code is capable of reading an image of a working partition from a container on the disk, and deploying that image onto the disk; and the further setup script when executed will cause the computer to perform steps that comprise creating the image from data in the partition outside the container, and storing the image in the container.

4. The computer system of claim 3, wherein the image of the working partition comprises a Microsoft Windows-brand operating system.

5. The computer system of claim 3, wherein the image of the working partition comprises a Linux-brand operating system.

6. A further setup method for a purpose such as facilitating recovery from corruption or other loss of data stored on a computer disk, the method for use on a computer that has an attached disk which is configured by at least an operating system installed in a partition, the method comprising:
　reserving space for a container anywhere on the disk;
　recording on the disk a physical address for identifying the location of the container space without making any changes to BIOS or disk firmware;
　on the computer, creating an image of the partition excluding the container space, without using a network connection;
　storing the image in the container; and
　storing disk recovery tools in the container if they are not part of the image.

7. The method of claim 6, wherein the reserving step reserves the container space in a file system in the partition which will have its image created.

8. The method of claim 6, wherein the reserving step reserves the container space outside the partition which will have its image created.

9. The method of claim 6, wherein the step of creating an image of the partition uses at least the recorded physical address to identify the container space and exclude it from the image.

10. The method of claim 6, further comprising the step of installing virtual boot code on the disk.

11. The method of claim 6, further comprising the step of creating a rescue floppy.

12. A computer system comprising a processor, RAM operably connected to the processor for executing code, and a disk accessible to the processor, wherein the disk is configured by: a container holding a recovery image in a space selected and reserved from anywhere on the disk; at least one sector list data structure that identifies a physical address location of that container; and code residing and running on the computer which will allow a user to deploy the recovery image without requiring any changes to BIOS or disk firmware onto the disk outside the container when no working, hidden or other partition is present on the disk.

13. The computer system of claim 12, wherein the disk is configured by code which will allow a user to deploy the recovery image as stated and to do so without making use of any secondary storage medium such as a floppy disk or a CD.

14. A computer system comprising a processor, RAM operably connected to the processor for executing code, and a disk accessible to the processor, wherein the disk is configured by: a container holding a recovery image in a space selected and reserved from anywhere on the disk; at least one sector list data structure that identifies a physical address location of that container; and code residing and running on the computer system which will allow a user to deploy the recovery image without requiring any changes to BIOS or disk firmware onto the disk outside the container without using any of the following: a second partition of any kind on the computer a secondary medium attached to the computer, or a network connection of the computer.

15. A computer-readable storage medium configured with code to perform an imaging setup method which comprises the steps of:
　reserving space for a container from anywhere on a computer disk;
　recording on the disk a physical address for identifying the location of the container space without making any changes to BIOS or disk firmware;

creating on the computer an image of a partition of the disk, the image excluding the container space;

storing the image in the container in the imaged partition; and storing code on the disk which will allow a user to deploy the image onto the disk even if no working, hidden or other partition is present on the disk, wherein this storing step may be partly or fully accomplished by the image storing step when the image includes code for deploying the image.

16. The configured medium of claim 15, wherein the method comprises locking the container to prevent access to the container when the image storing step is not in progress.

17. The configured medium of claim 15, wherein the image creating step uses at least one physical address of the container space to create a used sector map that excludes the container space from the collection of sectors to be imaged.

18. The configured medium of claim 15, wherein the step of creating an image creates a supplemental image.

19. The configured medium of claim 15, wherein the step of creating an image creates a replacement image.

20. A method for deploying an image onto a computer hard disk, which may be performed for a purpose such as recovery from the corruption or other loss of data, the method comprising the steps of:

running virtual boot code, from the hard disk, which is capable of booting the computer without making any changes to BIOS or disk firmware when the hard disk has no working, hidden or other partitions;

locating on the hard disk within a corrupted partition a container which holds an image of a hard disk partition;

deploying the located image onto the hard disk outside the container, thereby configuring the hard disk with a working partition which replaces the corrupted partition.

21. The method of claim 20, wherein the method is performed without the computer reading from any network connection, and without the computer reading from any removable storage medium.

22. The method of claim 20, further comprising the step of selecting from more than one image which is stored on the hard disk, and the deploying step deploys the selected image onto the hard disk.

* * * * *